Patented May 2, 1950

2,506,223

UNITED STATES PATENT OFFICE 2,506,223

BRUSHING LACQUER

Gustave Klinkenstein, Maplewood, N. J.

No Drawing. Application December 15, 1945,
Serial No. 635,415

8 Claims. (Cl. 260—13)

1

The present invention is directed to compositions which contain essentially cellulose plastic material and a specific type of synthetic resin compatible therewith. More particularly, the present invention is directed to the production of lacquers which after being brushed on the surface to be protected, become insoluble in the solvents after the composition has been aged.

Nitrocellulose and other lacquers having as a base a cellulose ester or ether have long been used for coating of various articles. Such compositions operate on the principle that upon evaporation of the solvent, the composition becomes dry and serves in its protective capacity.

All such compositions have the common defect that when it was desired to place a fresh coat on the surface by a brushing lacquer, the new coat picked up or dissolved part of the old brushing lacquer finish. Usually, a re-coating or re-painting was done with a different color than the original finish so that the mixing of the old and new compositions caused a blend of one color into another. This defect caused brushing lacquers to be regarded with disfavor and the use thereof has materially decreased.

For example, the defects inherent in prior compositions were such that if an article had previously been coated with a brushing lacquer which was, say a green color, and it was to be re-coated with a brushing lacquer of a pure white color, unless extreme skill were used by a person completely familiar with such compositions, it was impossible to avoid dissolving and picking up of the green color by the solvents contained in the white brushing lacquer. This usually resulted in the re-finished article showing unsightly and undesirable streaks of green color.

In the prior art there were known compositions of this character containing a cellulose ester or ether combined with various synthetic resins and suitable solvents. While various types of resins and solvents were used with the cellulose derivative and the proportions thereof were quite varied, the end result was that brushing lacquers made therewith still had the disadvantage that upon attempting to place a new coat upon an old finish, the old brushing lacquer dissolved in the solvents of the new finish. Therefore, although the compositions contained resins in varying proportions, they did not overcome the inherent and fundamental difficulty with the prior brushing lacquers.

It is among the objects of the present invention to overcome the difficulties and disadvantages inherent in brushing lacquers as previously provided, it being among the objects thereof to provide a brushing lacquer containing essentially cellulose plastic, a solvent and a synthetic resin, which composition has the property that it will not substantially disturb or detrimentally react on an old paint, varnish, enamel or lacquer coating by lifting or blistering such coating, or discoloring the same.

It is also among the objects of the present invention to provide a composition of the type indicated which has excellent brushing characteristics, which gives good coverage in a single brush coat, which may provide a good gloss and which has a mild odor.

It is further among the objects of the present invention to provide a brushing lacquer composition including a synthetic resin, wherein the resin by aging or other processes changes its chemical characteristics in such a manner that it is no longer soluble in the original solvents.

It is still further among the objects of the present invention to provide a composition containing solvents which are substantially non-solvents for the dried and aged brushing lacquer coating.

In carrying the objects of the present invention into effect, I provide a lacquer having as a base a cellulose derivative such as cellulose acetate or nitrate or other cellulose ester, cellulose ethers, such as benzyl or ethyl cellulose, and mixtures thereof. The solvents used in the composition are the ordinary solvents which are capable of dissolving relatively large amounts of the cellulose compound here collectively called a cellulose plastic.

The composition always contains a synthetic resin and it is essential for the present invention that the resin be of such character that it will change with age or with treatment so that it is no longer soluble in the solvents used for the lacquer. A type of resin which has been found suitable in the present invention is the alkyd type, consisting of esters of polybasic acids and polyhydric alcohols and modified with one or more higher fatty acids having sufficient unsaturation so as to absorb oxygen from the air and combine therewith chemically, whereby the composition is rendered substantially insoluble in the solvents previously used. Another type of resin which may be used is that which upon the application of elevated temperatures will polymerize or otherwise enter into chemical reaction and will also become insoluble in the solvents used in the composition. Still other types of resins having a similar property may be used, as for example, resins which will react with one or more of the other constitutents of the composition to become insoluble in the solvents or the like.

In the present invention the ratio of the cellulose plastic to the resin is quite important. Exhaustive experiments have shown that it is necessary to have a ratio of resin to cellulose plastic of more than 1 to 1. The range of proportions which have been found suitable for the purpose varies from about 2 to 4 parts of resin to 1 part of cellulose plastic. Some of the best compositions contain approximately three parts of resin to one part of cellulose plastic.

To such compositions may be added any of the normal constituents of lacquers. It is, of course, common to introduce various pigments and other coloring matter into the lacquer compositions and all such materials which are compatible with the constituents of the present lacquer may be introduced. Also, other ingredients, such as softeners or extenders may be introduced.

Compositions of the present invention have been found eminently suitable for re-painting or re-coating jobs, particularly for use by the general public. Such compositions have been found, upon application to a surface and allowed to dry, to become substantially tack-free in approximately the same time as lacquers heretofore known. After a period of exposure to the air or after the application of heat, the lacquer has become set or hardened to a point where the usual solvents for cellulose plastic compositions no longer dissolve the same. Such a result may in some cases be obtained in a number of days, and in other cases in a considerable number of weeks, depending on the character of the resins and other constituents of the lacquer. Then a second coating of a different color of brushing lacquer may be placed upon the aged coat without any danger that the first coat will be lifted even in small part, and such a result is obtained in spite of inexpert application of the top coat.

In practicing the invention, a brushing lacquer composition is made which has the following formula:

| | Parts by weight |
|---|---|
| V. M. and P. naphtha | 11.7 |
| Toluol | 8.2 |
| Hydrogenated naphtha | 12.7 |
| Den. alcohol | 3.6 |
| Butyl alcohol | 0.8 |
| Synthetic amyl alcohol | 9.5 |
| Ethyl acetate | 4.1 |
| Butyl acetate | 10.0 |
| Ethylene glycol mono butyl ether | 14.4 |
| Resin (solid) | 12.7 |
| Chrome Green | 6.1 |
| Nitrocellulose | 6.9 |

Various resins may be used therein and among such resins having the desired properties are the so-called alkyd resins formed from a polybasic acid, a polyhydric alcohol and a mono-basic acid. The alkyld resins which have been found to be particularly effective in the present invention have as the mono-basic acid constituent unsaturated higher fatty acids or mixtures of higher fatty acids containing unsaturated components. Among such alkyd resins there have been used with excellent results a resin made from phthalic anhydride, glycerine and the fatty acids of soya bean oil. Other similar compositions giving good results are formed by reaction of maleic anhydride, glycerine and soya bean fatty acids; or by the reaction of phthalic anhydride, glycerine and dehydrated ricinoleic acid. Alkyd resins modified by reaction with phenols or phenol compounds are also suitable. Still other resins are applicable in the present invention, such as drying oil modified phenol formaldehyde resins and urea melamine formaldehyde resins. All these resins have in common the property that after having been deposited from solution on a surface, they harden and age by exposure to air and/or the application to heat so that they become insoluble in the solvents originally used.

A composition of the above stated type may be brushed on a surface to be coated and the solvents allowed to evaporate. After a short time the film is sufficiently dry so that additional films may be placed thereon without disturbing the lower films. This is of particular importance in that it is often desired to paint a different color over a base and when it is accomplished with compositions of the present invention, there is formed a laminated structure wherein each film is binded to the adjacent film but there is no mingling thereof.

A comparative test was made with a green lacquer having as the resin constituent an alkyd modified with dehydrated castor oil, which is a drying oil. Such a composition was brushed on a panel and allowed to dry. Thereafter an identical composition wherein a white pigment was substituted for the green, was brushed over the base composition with fifteen strokes of the brush. Upon drying, it was found that there was no discoloration whatsoever in the top white film and none of the green had been taken into the film of white composition.

Simultaneously therewith there was provided a panel with a prior art type of lacquer having a damar resin or gum as the resin constituent, together with nitrocellulose, in the proportions of about 1 to 3, as is common in the prior art. This composition was simultaneously brushed on the panel and allowed to dry. Then a second composition identical with the first, except that a white pigment was substituted for the green, was brushed over the base coat with fifteen strokes of the brush. The top coat became greatly discolored and was green practically throughout.

One of the essential differences between the present invention and the prior art is the proportions of nitrocellulose and resin. Applicant provides a greater amount of the resin than nitrocellulose and obtains a set of properties quite different from prior art products. Because of the high proportion of the particular synthetic resin used, there is polymerization and/or other changes such as oxidation of the resin and thus it is rendered insoluble in the normal solvents. Therefore, there will be no bleeding or pick-up on placing a top coat thereon. Because of the presence of nitrocellulose, even though in low proportion, the brushed film dries quickly to a dust-free stage. This is quite in contrast to the old type of oleoresinous varnishes which were very slow drying, which picked up dust, and wherein the film remained sticky for a long time.

The present compositions also differ from prior art compositions in that the proportion of resin and nitrocellulose in the lacquer is considerably higher than was generally used in the prior art. According to the present invention, there is in the neighborhood of 20% by weight of the cellulose plastic and resin mixture in the solution. According to the prior art, usually about 10% by weight of such constituents were present in the lacquer. Therefore, lacquers of the present invention require a lesser number of coats to obtain a desired thickness of film.

Although the invention has been described setting forth a single formulation, such specific example does not limit the invention but serves to illustrate the same. Various other types of solvents and diluents may be used in the compositions, the proportions may be changed to a substantial degree, and various pigments may be used. Also, clear lacquers may be made and if desired, dyes may be introduced. The particular resins specified above have been found to give excellent results but the invention is not limited thereto as other resins may serve the present purpose equally well. These and other changes may be made in the details of the invention without departing from the spirit thereof and the scope of the invention is not to be limited except by the character of the claims appended hereto.

I claim:

1. A coating composition for brushing comprising a cellulose plastic taken from the class consisting of cellulose esters and ethers, a synthetic resin compatible therewith taken from the class consisting of alkyd resins modified by fatty acids of vegetable oils, and urea-melamine-formaldehyde resins, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and of said glycol ether.

2. A coating composition for brushing comprising cellulose nitrate plastic, an alkyd resin modified by dehydrated ricinoleic acid, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and said glycol ether.

3. A coating composition for brushing comprising cellulose nitrate plastic, a urea-melamine-formaldehyde resin, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than amounts of said non-solvent and said glycol ether.

4. A coating composition for brushing comprising cellulose nitrate plastic, an alkyd resin modified by dehydrated ricinoleic acid, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and said glycol ether, said glycol ether being ethylene glycol monobutyl ether, said non-solvent being a mixture of napthas and toluol, said alcohol being a mixture of ethyl butyl and amyl alcohols, and said acetate being a mixture of ethyl and butyl acetates.

5. A coating composition for brushing comprising cellulose nitrate plastic, a urea-melamine-formaldehyde resin, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and said glycol ether, said glycol ether being ethylene glycol monobutyl ether, said non-solvent being a mixture of napthas and toluol, said alcohol being a mixture of ethyl butyl and amyl alcohols, and said acetate being a mixture of ethyl and butyl acetates.

6. A coating composition for brushing comprising cellulose nitrate plastic, an alkyd resin modified by soya bean fatty acid, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and said glycol ether.

7. A coating composition for brushing comprising cellulose nitrate plastic, an alkyd resin modified by soya bean fatty acid, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and said glycol ether, said glycol ether being ethylene glycol monobutyl ether, said non-solvent being a mixture of napthas and toluol, said alcohol being a mixture of ethyl butyl and amyl alcohols, and said acetate being a mixture of ethyl and butyl acetates.

8. A coating composition for brushing comprising a cellulose plastic taken from the class consisting of cellulose esters and ethers, a synthetic resin compatible therewith taken from the class consisting of alkyd resins modified by fatty acids of vegetable drying oil, and urea-melamine-formaldehyde resins, said resin being present in an amount greater than said plastic and up to four times the amount thereof, dissolved in a mixture of organic substances including readily volatile glycol ether, monohydric alcohol, alkyl acetate and non-solvent hydrocarbon, the amount of acetate being less than the amounts of said non-solvent and of said glycol ether.

GUSTAVE KLINKENSTEIN.

REFERENCES CITED

The following references are of record in the file of this patent:

UNITED STATES PATENTS

| Number | Name | Date |
| --- | --- | --- |
| 2,038,764 | Seymour | Apr. 28, 1936 |
| 2,125,484 | Bogin | Aug. 2, 1938 |

FOREIGN PATENTS

| Number | Country | Date |
| --- | --- | --- |
| 350,463 | Great Britain | June 9, 1931 |
| 377,724 | Great Britain | July 25, 1932 |